Jan. 7, 1947.  R. DIARD  2,413,910
LOGGING TRAILER
Filed Oct. 18, 1945  3 Sheets-Sheet 2

INVENTOR
Ray Diard

BY
ATTORNEY

Jan. 7, 1947.      R. DIARD      2,413,910
LOGGING TRAILER
Filed Oct. 18, 1945      3 Sheets-Sheet 3
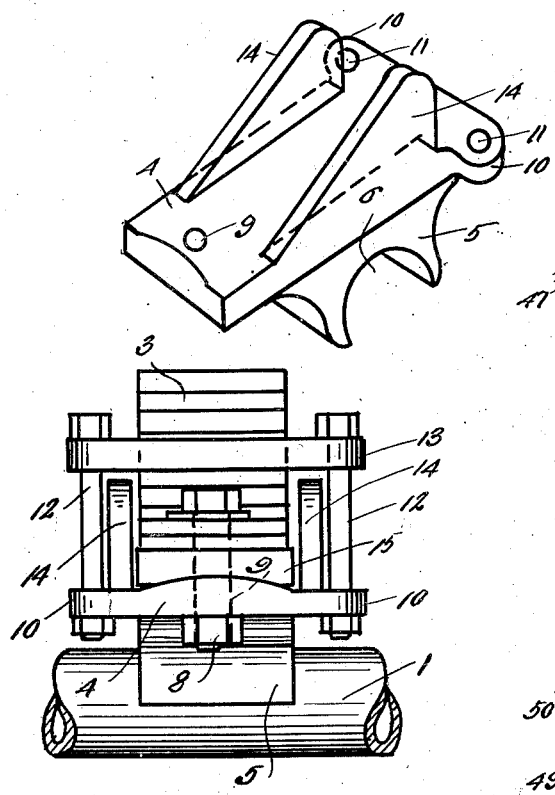
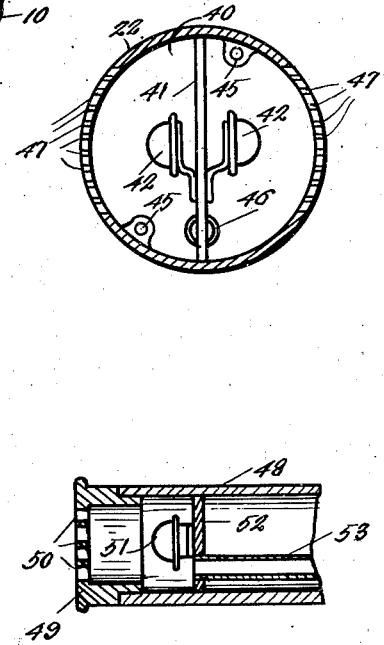
INVENTOR
Roy Diard
BY Glenn L. Fish
ATTORNEY Patented Jan. 7, 1947

2,413,910

UNITED STATES PATENT OFFICE 2,413,910

LOGGING TRAILER

Ray Diard, Priest River, Idaho

Application October 18, 1945, Serial No. 623,051

9 Claims. (Cl. 280—104.5)

This invention relates to a logging trailer and it is one object of the invention to provide a trailer which is of light weight and will thus permit a large load of logs to be loaded upon the trailer and transported from one place to another. The load capacity of a trailer is rated by the size of the tires and by providing a trailer with a strong but light weight construction; a trailer having tires of a certain size may carry a larger load of logs than a trailer which is of heavy weight in order to have the necessary strength to support a load of logs.

Another object of the invention is to provide a trailer having an improved arrangement of water tanks, air tanks, bearings, spring supports and housed signal lights.

Another object of the invention is to so form and mount the tanks that they counterbalance each other and allow the trailer to ride smoothly without excessive jolting.

Another object of the invention is to so form the spring supports that front and rear portions of the springs will be mounted over the axles by members which serve as supports for the springs as well as for holding the axles in proper parallel relation to each other.

The invention is illustrated in the accompanying drawings wherein:

Figure 4 is a perspective view of a spring-supporting block.

Fig. 5 is a sectional view upon an enlarged scale taken transversely through a signal light on the line 5—5 of Figure 3.

Fig. 6 is a view taken along the line 6—6 of Figure 1.

Fig. 7 is a sectional view taken longitudinally through the tail light.

Figure 1:
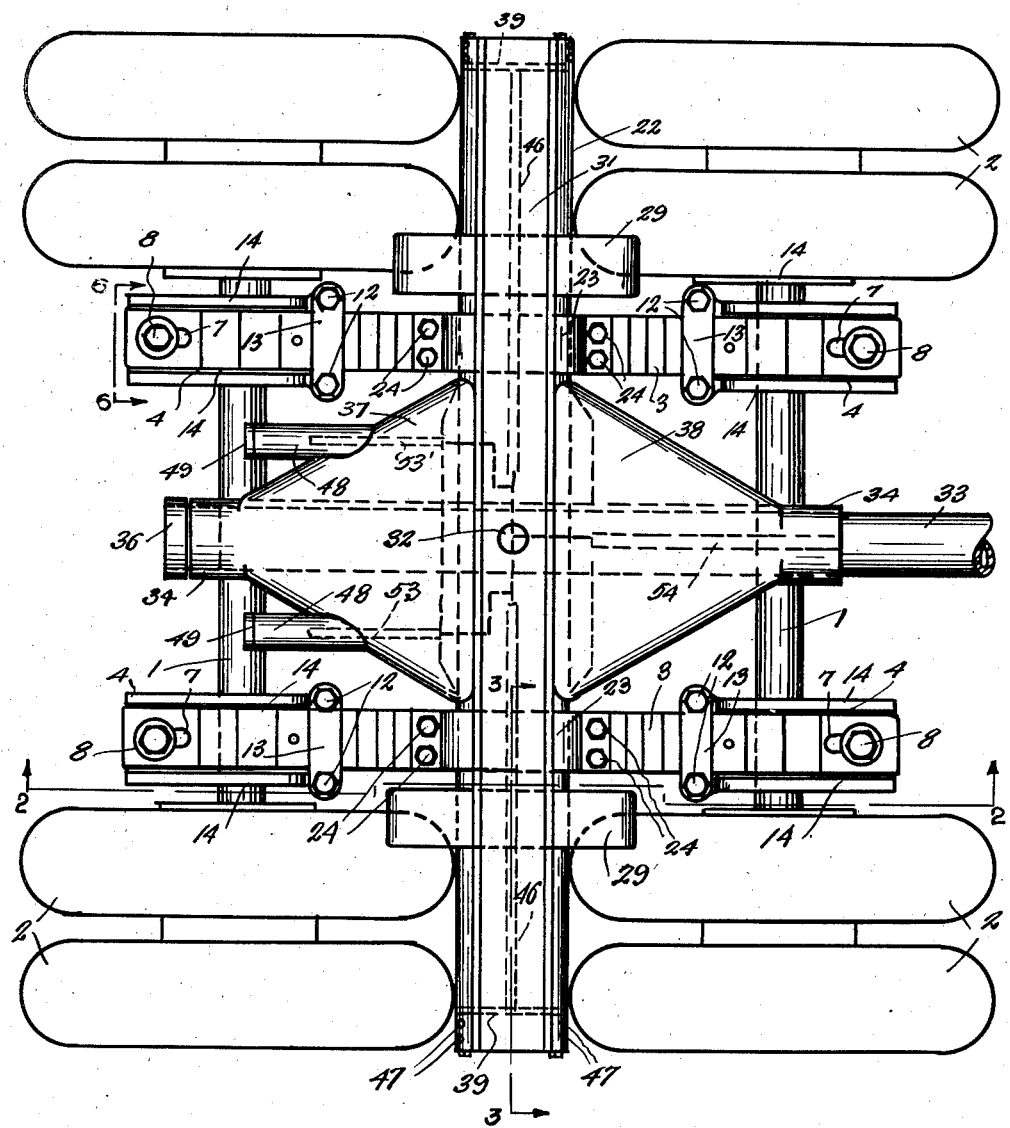
Fig. 1 is a top plan view of the improved trailer.
Figure 2:
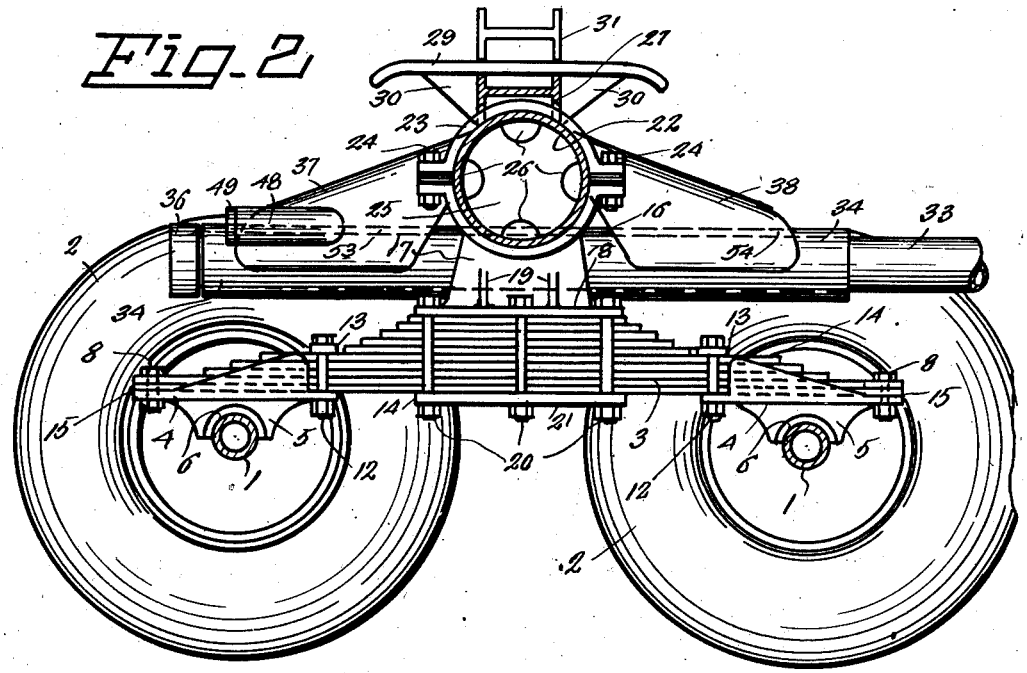
Fig. 2 is a longitudinal sectional view taken along the line 2—2 of Figure 1.
Figure 3:
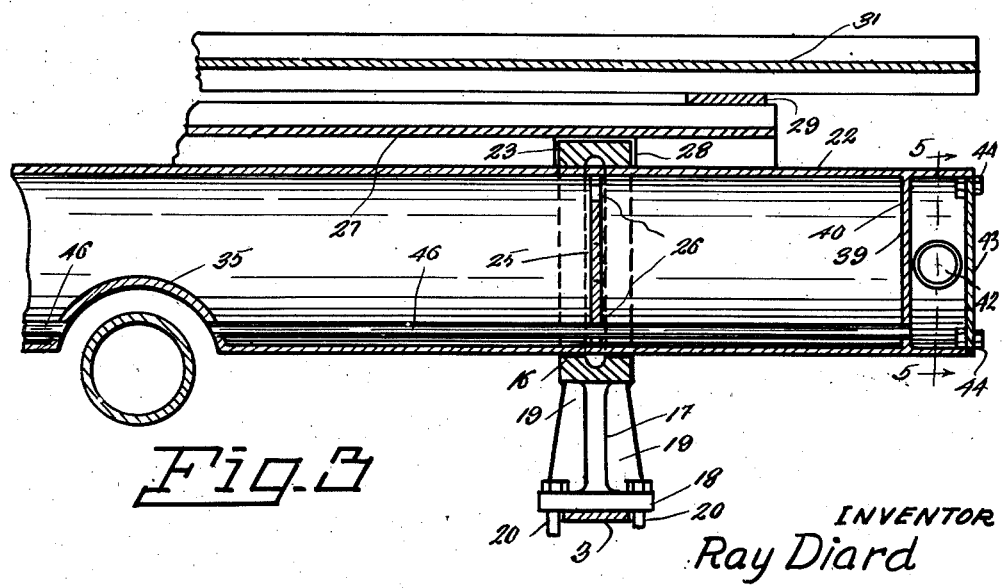
Fig. 3 is a fragmentary sectional view taken along the line 3—3 of Figure 1.

The improved trailer has axles 1 carrying wheels 2. Leaf springs 3 extend longitudinally of the trailer at opposite sides thereof between the axles and at their ends rest upon blocks or castings 4 provided with depending saddles 5 having recesses 6 in their lower portions so that the saddles may straddle the axles to which they are welded in order to firmly hold them in engagement with the axles. Registering slots 7 are formed in the lower leaves of the leaf springs to receive bolts 8 by means of which they are secured to the castings. The bolts pass through openings 9 formed in outer end portions of the castings and since the slots 7 extend longitudinally of the castings the leaf springs may have restricted movement longitudinally of the trailer when subjected to weight of logs loaded upon the trailer. Ears 10 project from opposite sides of inner ends of the castings and are formed with openings 11 to receive bolts 12 which also pass through cross bars 13 extending across the leaf springs and assist in holding the springs upon the castings or blocks 4. Wings 14 extend upwardly along opposite side edges of the castings and prevent transverse movement of the leaves of the springs. Since the upper face of each casting is formed with a transversely curved crowned surface upon which rests a plate 15 a limited transverse rocking of the springs and the castings is permitted and the trailer may move over rough roads without excessive jolting.

Over the central portion of each spring is a bearing 16 carried by a pedestal 17 formed with a base plate 18 and braced against side strains by webs 19. Bolts 20 pass through side edge portions of the base 18 and also through a plate 21 engaging the under face of the lower leaf of each spring and all of the leaves of the springs will thus be held in flat face to face engagement with each other and the pedestals held firmly upon the springs. A cylindrical water tank 22 extends transversely of the trailer and rests in the bearings 16 where it is held by bearing caps 23 which are secured by bolts 24 and in order to brace the cylinder there have been provided plates 25 in the cylinder formed with openings 26 so that water may flow longitudinally in the cylinder and maintain an even depth at all points throughout its length. Upon the water tank 22 is mounted an H-beam 27 having its side flanges formed with openings 28 to accommodate the bearing caps 23 and upon the beam 27 are mounted bars 29 which extend longitudinally of the trailer and have portions projecting from the beam 23 and braced by webs 30. A bunk or bolster 31, formed with an H-beam, rests upon the bars or boards 29 and since this bunk is connected with the beam 27 by a bolt or king pin 32 the trailer may have transverse swinging movement relative to the bunk and to logs which rest upon the bunk.

In order to hitch the trailer to a main logging truck there has been provided a tongue or pole 33 which is formed of metal tubing and may be of any length desired. This pole is slidably mounted through a sleeve 34 which extends longitudinally of the trailer midway the width thereof and passes through a recess formed in the under portion of the water tank 22 by an upwardly arched portion 35, the rear end of the pole carrying a collar 36 to limit forward movement of the pole through the sleeve by engagement with the rear end thereof and cause the trailer to be moved forwardly when pull is exerted upon the pole. The sleeve 34 is rigid with a water tank 37 and an air tank 38 which project from the cylindrical water tank 22 and are preferably of the substantially triangular shape shown in Figure 1. Since the pole is unobstructed forwardly of the sleeve the trailer may be shifted forwardly along the pole or the pole thrust rearwardly through the sleeve and thus allow the trailer to be brought to a position in which it is close to a towing truck and its front wheels set at rest upon the towing truck.

It is desired to provide the trailer with signal lights at its sides and in order to do so end portions of the cylindrical water tank are provided with transverse partitions 39 set inwardly from ends of the tank and constituting inner walls of chambers 40 which are each divided into front and rear compartments by a vertical partition 41 to which electric lights 42 are mounted. Caps 43 which close outer ends of the chambers 40 are removably secured by screws 44 which pass through the caps and engage in ears 45 and when a bulb of a lamp burns out it is merely necessary to remove a cap 43 and a new bulb may be inserted. Current for energizing the lamps is supplied by circuit wires which pass through tubes 46 extending longitudinally in the water tank 22. Front and rear walls of the chambers 40 are formed with openings 47 for passage of light from the chambers.

There have also been provided tail lights 48 which extend rearwardly from opposite side portions of the water tank 37 and have caps 49 at their rear ends formed with openings 50 for passage of light from the lamps 51 of the tail lights. The lamp of each tail light is carried by a partition 52 in the casing of the tail light and current is supplied to the lamps by wires which pass through tubes 53. There has also been provided a tube 54 extending longitudinally through the forward portion of the sleeve 34 so that wires for the lamps may be passed through the sleeve.

Having thus described the invention, what is claimed is:

1. A logging trailer comprising front and rear axles, wheels carried by said axles, leaf springs extending longitudinally of the trailer, blocks under end portions of the leaf springs and each having a depending saddle, the saddles of said blocks straddling the axles and being welded thereto, wings extending upwardly from said blocks along opposite sides of said leaf springs, ears projecting from opposite sides of inner ends of said blocks, clamping bars extending across the leaf springs with ends projecting over said ears, bolts passing through the ears and ends of the clamping bars and firmly holding end portions of the leaf springs upon said blocks, the upper surface of each block having a transversely arcuate crown upon which lower leaves of the springs rest, bolts passing through slots formed in end portions of the lower leaves and through openings in outer ends of the blocks and allowing sliding of end portions of the leaf springs along the blocks when subjected to weight, bearings carried by said springs, a cylinder extending through said bearings, and a bunk mounted over said cylinder.

2. A logging trailer comprising front and rear axles, leaf springs extending longitudinally of the trailer with their end portions overhanging the axles and supported thereon, bearings carried by said springs and projecting upwardly therefrom, a cylinder extending transversely of the trailer and mounted through said bearings, a water tank extending from said cylinder rearwardly of the trailer, an air tank extending from the cylinder forwardly of the trailer, a bunk mounted over the cylinder transversely of the trailer, a tube extending longitudinally of the trailer under said cylinder and a tongue slidably passing through said tube and projecting forwardly therefrom and having a collar about its rear end for limiting forward movement through the tube.

3. A logging trailer comprising front and rear axles, springs extending between said axles and supported thereon, bearings carried by said springs, a cylindrical water tank extending transversely of the trailer and mounted in said bearings, a beam mounted upon said tank longitudinally thereof, bars carried by said beam and projecting from opposite sides thereof longitudinally of the trailer, a bunk extending longitudinally of said beam and resting upon said bars, a king pin midway the length of the bunk and the beam pivotally mounting the bunk, a tube extending longitudinally of the trailer under said beam and a pole slidable longitudinally through said tube and having an abutment at its rear end.

4. A logging trailer comprising front and rear axles, springs extending between and carried by said axles, bearings carried by said springs, a cylindrical water tank extending transversely of the trailer and mounted through said bearings, a beam mounted upon said tank longitudinally thereof, a bunk over said beam pivotally mounted, a tank extending forwardly and rearwardly from the cylindrical tank, a sleeve extending longitudinally of the trailer under the cylindrical tank and having forward and rear portions fixed to the last mentioned tanks, a pole extending longitudinally of the trailer and slidably mounted through the tube, and a collar about the rear end of the pole limiting its forward sliding through the tube.

5. A logging trailer comprising front and rear axles, springs extending between and carried by said axles, bearings carried by said springs, a cylindrical water tank extending transversely of the trailer and mounted through said bearings, a beam mounted upon said tank longitudinally thereof, and formed with recesses through which the bearings pass, a bunk over said beam, a tube extending longitudinally of the trailer through a recess, the under portion of said tank, and a pole slidable longitudinally through said tube and having an abutment limiting its forward movement.

6. A logging trailer comprising axles, springs carried by said axles, a cylindrical tank mounted over said springs transversely of the trailer, heads set inwardly from ends of said tank and constituting inner walls for chambers in ends of the tank, vertical partitions dividing the chambers into front and rear compartments, lamps in the compartments carried by said partitions and removable caps closing outer ends of said chambers, portions of the tank forming front and rear walls of the chambers being formed with openings for passage of light from the compartments.

7. A logging trailer comprising axles, springs carried by said axles, a cylindrical tank mounted over said springs transversely of the trailer, there being chambers at ends of said tank formed with openings in front and rear portions for outlet of light from the chambers, lamps in said chambers, and removable caps for said chambers.

8. A logging trailer comprising axles, springs carried by said axles, a cylindrical tank mounted over said springs transversely of the trailer, a tank extending rearwardly from the cylindrical tank, a pole extending longitudinally of the trailer and slidably mounted under the tanks, and tail lights carried by the rearwardly extending tank at opposite sides of said pole.

9. A logging trailer comprising axles, springs carried by said axles, a cylindrical tank mounted over said springs transversely of the trailer, a tank extending rearwardly from the cylindrical tank, a pole extending longitudinally of the trailer and slidably mounted under the tanks, and tail lights carried by the rearwardly extending tank at opposite sides of said pole, each tail light having a cylindrical casing open at its rear end, a partition in the casing, a lamp carried by said partition and a perforated cap for the rear end of the casing.

RAY DIARD.